United States Patent [19]

Madsen et al.

[11] Patent Number: 5,600,500

[45] Date of Patent: Feb. 4, 1997

[54] PERFORMANCE BASED WRITE CURRENT OPTIMIZATION PROCESS

[75] Inventors: Timothy A. Madsen, Bloomington; Michael J. Roe, Ramsey, both of Minn.

[73] Assignee: Seagate Technology, Inc., Scotts Valley, Calif.

[21] Appl. No.: 337,306

[22] Filed: Nov. 14, 1994

[51] Int. Cl.⁶ ........................................................ G11B 5/09
[52] U.S. Cl. ................................................ 360/46; 360/53
[58] Field of Search ............................. 360/45, 46, 53

[56] References Cited

U.S. PATENT DOCUMENTS

| | | | |
|---|---|---|---|
| 4,821,125 | 4/1989 | Christensen et al. | 360/46 |
| 5,121,262 | 6/1992 | Squires et al. | 360/46 |
| 5,172,280 | 12/1992 | Quintus et al. | 360/46 |
| 5,206,053 | 4/1993 | Tanaka | 360/45 |
| 5,371,638 | 12/1994 | Saliba | 360/77.12 |
| 5,379,162 | 1/1995 | Cunningham et al. | 360/53 |
| 5,390,054 | 2/1995 | Youngquist et al. | 360/66 |
| 5,408,367 | 4/1995 | Emo | 360/53 |

*Primary Examiner*—W. C. Kim
*Attorney, Agent, or Firm*—Westman, Champlin & Kelly, P.A.

[57] ABSTRACT

A method of optimizing write current in a data storage system. The write current is optimized by measuring a bit error rate in the storage system as a function of the write current in the presence of background interference stress and adjacent track interference stress. An optimum write current level is determined as a function of the measured bit error rate.

18 Claims, 7 Drawing Sheets

PERFORMANCE BASED WRITE CURRENT OPTIMIZATION PROCESS

BACKGROUND OF THE INVENTION

The present invention relates to disc drives. More particularly, the present invention relates to optimizing write current in the disc drive.

A typical disc drive includes a drive controller, an actuator assembly and one or more magnetic discs mounted for rotation on a hub or spindle. The drive controller controls the disc drive based on commands received from a host system. The drive controller controls the disc drive to retrieve information from the magnetic discs and to store information on the magnetic discs. The actuator assembly includes an electromechanical actuator coupled to the drive controller and an actuator arm for supporting a head-gimbal assembly over each magnetic disc. The head-gimbal assembly carries a data head comprising a hydrodynamic air bearing and a transducer for communicating with the surface of the disc.

The electromechanical actuator operates with the drive controller within a negative feedback, closed-loop servo system. The actuator moves the data head radially over the disc surface for track seek operations and holds the transducer directly over a desired track on the disc surface for track following operations.

There are typically two steps in positioning the data head over the track. The first is referred to as coarse positioning, and the second is referred to as fine positioning. During coarse positioning, the servo system positions the data head over a track on the disc based upon a track address position signal received from the host system indicating track to be accessed. The data head is typically smaller than the distance between tracks on the disc. Therefore, fine positioning is used to appropriately position the data head within the track over which it is positioned during coarse positioning.

Information is typically stored in concentric tracks on the disc surfaces by providing a write signal to the data head. The write signal encodes the information within the tracks through a sequence of magnetic flux reversals. Each flux reversal represents a change between a logical "1" and a logical "0" or between a logical "0" and a logical "1".

In retrieving data from the disc, the drive controller controls the actuator so that the data head flies above the desired data track, sensing the magnetic flux reversals stored within the data track, and generating a read signal based on the flux reversals. The read signal includes a serial train of high frequency pulses that are decoded by the drive controller to recover data represented by the flux reversals. When a flux reversal is either not written properly on the data track during a write operation or not detected properly during a read operation, the result is a bit error in the data read from the disc surface.

When the data head is not properly located within the track, it is said to be "off-track". The further off-track the data head is when either writing or reading, the larger the noise-to-signal ratio for the operation. If the noise-to-signal ratio is large, the error rate will be large in reading data from the disc.

There are two types of errors that occur during reading and writing. A "hard" error is an error that is the result of defect on a specific location on the disc itself. A "soft" error is an error that is not the result of a disc defect. Each soft error has a different location on the disc surface and is generally not repeatable.

Many different measurements have been used to characterize soft error rate performance indirectly, including error rate measurements such as position error margin, timing margin and average minimum track spacing, and measurements involving significant averaging such as overwrite capability, high frequency amplitude and resolution. Position error refers to the data head being off track with respect to an ideal read position over a data track. Position error margin refers to the margin at which the data head can be off track while maintaining an acceptable soft error rate. Therefore, there is a desire to maximize position error margin.

Timing margin is a measure of the extent to which the system clock in the data storage system can be shifted relative to a read pulse before the data represented by the read pulse becomes associated with an adjacent (and incorrect) clock cycle. The system clock in the disc drive is adjusted to line up with the average position of the read pulses so that the pulses arrive in the appropriate clock cycle.

Average minimum track spacing (or "ATS") is a measure of how close adjacent data tracks can be positioned to one another for a particular data head without degrading the position error margin. If the head is too wide due to manufacturing tolerances, the position error margin may be insufficient as a result of the head having an ATS value that is greater than the product track "pitch". Track pitch is the actual distance between adjacent track centers. The "average" minimum track spacing is the average of the minimum calculated track spacing intercepts to the right and to the left of the ideal track position. There is a desire to constrain the average minimum track spacing for each data head to be less than the product track pitch.

Overwrite capability is the capability of the data head to write new data over previously written data on the disc surface. There is a desire to maximize the overwrite capability to minimize the previously written data's effect on the newly written data. Overwrite capability is measured by comparing the frequency content of an original data signal with the frequency content of the data signal after an overwrite condition involving a different write signal frequency.

High frequency amplitude is the amplitude of the read signal induced in the data head by closely spaced flux reversals (transitions). The more abrupt the flux reversal, the greater the rate of change of magnetic flux, the less the interference between neighboring transitions, and the greater the amplitude of the induced voltage in the data head.

Resolution is a ratio of the high frequency amplitude to the low frequency amplitude. Low frequency amplitude is the amplitude of the read signal induced in the data head by widely spaced flux reversals. Each flux reversal generates a bell shaped analog read signal pulse across the head. The low frequency amplitude of the read signal is usually larger than the high frequency amplitude of the read signal because it does not suffer from interference between neighboring transitions. If the amplitude of the high frequency signal is too low with respect to the amplitude of the low frequency signal, then the detection circuitry may not detect some flux reversals when decoding the analog read signal. Data recovery capability has been shown to improve if the high frequency amplitude increases for a given low frequency amplitude (if resolution increases) or if both the high and low frequency amplitudes increase for a given noise level.

Manufacturing tolerances incurred during the fabrication process of the data head may have adverse effects on the error rate performance factors mentioned above. These manufacturing tolerances may result in pole tip saturation problems and marginally wide head situations, among other performance problems. Pole tip saturation occurs in the data head during write operations when additional magnetic field applied to the head results in no further increase in the data head's magnetization at the gap edge of the trailing pole tip. As a result, the media is recorded with a more gradually changing magnetic field which produces a more gradual transition in the media that is later transduced by the head in a read mode to form a broader pulse than usual. Broad pulses are more likely to cause errors in the read operation. Data heads having relatively short throat lengths are more likely to experience pole tip saturation than data heads having relatively long throat lengths.

Manufacturing tolerances also affect the effective width of the data head. If the data head is too wide, the magnetic field generated during write operations may adversely affect the data written on adjacent data tracks. During read operations, the data read from the disc surface by a wide head may be corrupted by adjacent track interference. If the data head is too narrow, the read signal amplitude may be too small. This adversely affects position error margin. In other words, the data head cannot get very far off track without creating an unacceptable level of bit errors in the data read from the data track.

The soft error rate performance can often be improved by optimizing the write current. Methods of optimizing the write current in the prior art have been based on on-track factors, such as high frequency amplitude, overwrite, on-track timing margin or resolution. However, these methods do not adequately test or compensate for pole tip saturation and marginally wide head situations such that position error margin is maximized, especially in the presence of adjacent track interference. As a result, a greater number of heads may fail the manufacturing test procedures than would otherwise be necessary, resulting in a lower production yield.

SUMMARY OF THE INVENTION

The present invention is a method of optimizing write current in a data storage system. The method includes measuring off-track error rate in the storage system as a function of the write current. An optimum write current level is determined as a function of the measured off-track error rate.

In a preferred embodiment, the write current is optimized for each head early in the production evaluation process such that off-track error rate is minimized in the presence of background interference stress and adjacent track interference stress. This allows compensation for pole tip saturation and marginally wide head situations. As a result, a greater number of heads pass the evaluation process, which results in a higher production yield.

The data storage system measures the error rate by selecting a large initial write current level that is usually greater than the optimum write current level. The storage system writes background interference at the selected write current level to each side of a first data track in the system using large off-track positions on each side of the first data track. The storage system then writes data at the selected write current level on the first data track. Next, the storage system writes adjacent track interference at the selected write current level on data tracks that are adjacent to the first data track. It is desirable to use pseudo-random data generated with different seeds for each write operation and to write the adjacent tracks at an off-track position which places the transducer even closer to the data track to simulate servo track writing error.

The storage system reads the data from the first data track and measures the soft error rate. In one embodiment, the read operation is performed at a large off-track position. The soft error rate can be either a ratio of the number of errors per data bit read from the first data track or simply a count of the number of errors incurred during the read operation. It could even be measured inversely as a number of good bits read per error. The measured soft error rate is then logged in memory for future analysis. The logged soft error rate corresponds to the selected write current level.

Next, the storage system decreases the selected write current level. Write current levels are not always continuously adjustable. Some disc drives have only a few selectable write current levels. In these drives, the write current level is decreased to one of the other selectable levels.

After the selected write current level is decreased, the storage system repeats the steps of writing the background interference, writing the adjacent track interference, reading the data, measuring the soft error rate and logging the measured soft error rate. Each logged soft error rate corresponds to a particular write current level.

The optimum write current level is the level that results in the lowest soft error rate. The optimum write current level can be estimated by simply selecting the lowest logged soft error rate, by curve fitting or by averaging methods.

In a preferred embodiment, the step of reading the data from the first data track is performed at an off-track radial position that corresponds to a specified soft error rate, such as $1 \times 10^{-6}$ errors/bit. This increases the speed of the optimization process since soft errors are collected more frequently at an off-track radial position.

DETAILED DESCRIPTION OF THE PREFERRED EMBODIMENTS

The present invention is a write current optimization process for a disc drive that is based on a measured bit error rate. The bit error rate is measured as a function of the write current in the presence of background interference stress and track-adjacent track interference stress.

Figure 1:
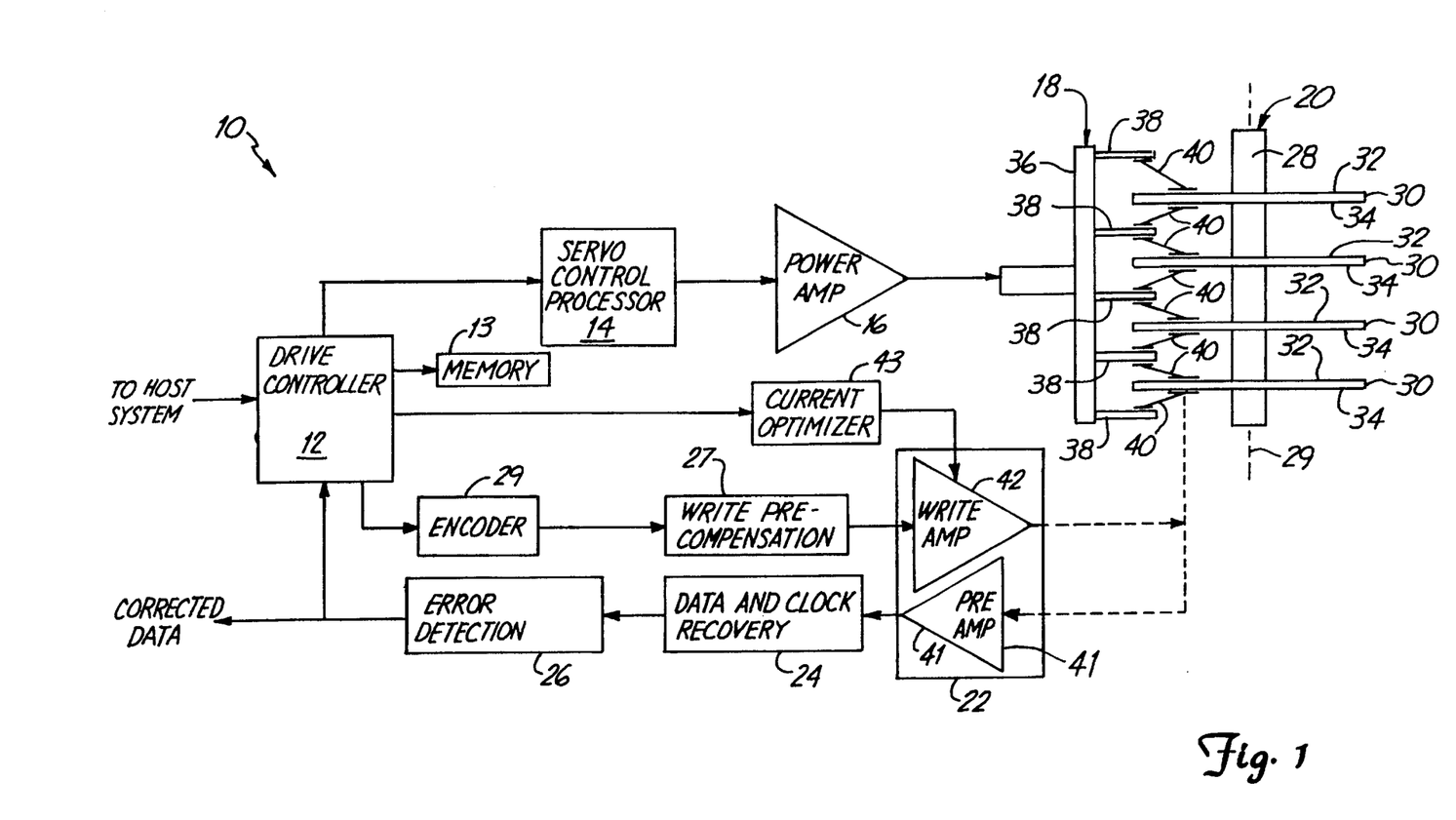
FIG. 1 is a block diagram of a portion of a disc drive according to the present invention.

FIG. 1 is a block diagram of disc drive 10 according to the present invention. Disc drive 10 includes drive controller 12, memory 13, servo control processor 14, power amplifier 16, actuator assembly 18, disc stack assembly 20, read/write interface 22, data and clock recovery circuit 24, error detection circuit 26, write precompensation circuit 27, and encoder 29.

Drive controller 12 is typically a microprocessor, or digital computer, and is coupled to a host system, or another drive controller which controls a plurality of drives. Drive controller 12 operates based on programmed instructions stored in memory 13 and received from the host system.

Disc stack assembly 20 includes spindle 28 which supports a plurality of coaxially arranged discs 30. Discs 30 are mounted for rotation with spindle 28 about an axis of rotation 29. Each of the discs 30 has a first surface 32 and a second surface 34. Surfaces 32 and 34 include concentric tracks for receiving and storing data in the form of magnetic flux reversals encoded on the tracks. A group of tracks includes one track per surface 32 and 34, and is referred to as a cylinder. Each track in the group is located at a common radial distance from the inner diameter of the corresponding disc 30 upon which it resides.

Actuator assembly 18 includes an actuator 36 supporting a plurality of actuator arms 38. Each of the actuator arms 38 is rigidly coupled to at least one head-gimbal assembly 40. Each head-gimbal assembly includes a load beam, or flexure arm, rigidly coupled to actuator arm 38 at a first end thereof, and to a gimbal at a second end thereof. The gimbal is, in turn, coupled to a hydrodynamic bearing, such as an air bearing, which supports a data head above the corresponding disc surface, 32 or 34, for accessing data within the tracks on the disc surface.

Actuator 36 is rotatably mounted with respect to discs 30. As actuator 36 rotates, it moves the data heads coupled to the head-gimbal assemblies 40 either radially inward, toward an inner radius of the corresponding disc 30, or radially outward, toward an outer radius of the corresponding disc 30. In this way, actuator 38 positions the data heads on head-gimbal assemblies 40 over a desired track (and cylinder) on the discs 30.

In operation, drive controller 12 typically receives a command signal from the host system which indicates that a certain portion of a disc 30 on disc stack assembly 20 is to be accessed. In response to the command signal, drive controller 12 provides servo control processor 14 with a position signal which indicates a particular cylinder over which actuator 36 is to position head-gimbal assemblies 40. Servo control processor 14 converts the position signal into an analog signal which is amplified by power amplifier 16 and provided to actuator assembly 18. In response to the analog position signal, actuator 18 positions head-gimbal assemblies 40 over the desired cylinder for course positioning. Actuator assembly 18 also positions head-gimbal assemblies 40 at a desired relative position within a track for fine positioning.

One or more of the disc surfaces 32 and 34 have positioning information that provides both coarse and fine positioning feedback through the read channel to the servo control processor 14 for better positioning. Servo control processor 14 reacts to the position information read from the disc stack assembly 20 and positions the head-gimbal assemblies 40 accordingly. Course and fine head positioning is discussed in further detail in co-pending U.S. application Ser. No. 08/285,568, filed Aug. 3, 1994, and entitled "Transducer Positioning Based On Off-Track Error Rate," which hereby is incorporated by reference.

The command signal from drive controller 12 also indicates the particular sector to be read from or written to. If the particularly identified disc and sector are to be read, the data head on the corresponding head-gimbal assembly 40 generates a read signal in response to the stored magnetic flux reversals. The data head provides the read signal to read/write interface 22. Read/write interface 22 includes a preamplifier 41 which amplifies the read signal and provides it to data and clock recovery circuit 24. Data and clock recovery circuit 24 recovers the data, which is encoded on the disc surface when the data is written to the disc surface. Data and clock recovery circuit 24 operates in a known manner.

Once the data is recovered, it is provided to error detection circuit 26 which, in this embodiment, is based on an error correction code (ECC), such as a Reed-Solomon code. Error detection circuit 26 detects whether any errors have occurred in the data read back from the disc.

In one embodiment, error detection circuit 26 is equipped with error correction logic which is used to correct errors discovered in the data read back from the disc. The corrected data is provided to the host system. In another embodiment, error detection circuit 26 simply provides an indication to drive controller 12 that the data being provided includes errors, and provides drive controller 12 with the information necessary so that drive controller 12 can correct the data and provide corrected data to the host system.

During a write operation, the host system provides drive controller 12 with a command signal which indicates the amount of data to be stored and the particular data tracks and sectors at which the data is to be stored. The host system also transfers the data to be stored to a buffer in memory 13 so the data can be accessed by drive controller 12. Drive controller 12 provides the data to encoder 29. Encoder 29 encodes the data into a serial train of write pulses representing magnetic flux reversals to be written on the disc surfaces 32 and 34. Encoder 29 operates in a known manner.

Write precompensation circuit 27 modifies the serial train of write pulses by performing an operation known as a non-linear or pattern dependent transition shift. Write precompensation circuit 27 shifts the relative position of the write pulses to properly space the flux reversals on the disc surfaces 32 and 34. Write precompensation circuit 27 also operates in a known manner.

The write pulses are then passed to a write amplifier circuit 42 within read/write interface 22. In one embodiment, write amplifier circuit 42 includes a well known H-switch which directs current through the data head in one of two directions as a function of the write pulses.

Disc drive 10 further includes a write current optimizer 43 coupled to the write amplifier circuit 42. In one embodiment, optimizer 43 is part of drive controller 12 and operates based on programmed instructions stored in memory 13. However, optimizer 43 can be part of the host system or a separate circuit coupled between drive controller 12 and write amplifier 42. Optimizer 43 is shown in FIG. 1 as a separate circuit for illustration purposes.

According to the present invention, the write current optimizer 43 optimizes the write current level to maximize position error margin for each data head. The drive controller 12 receives a start-up command from the host system which instructs the drive controller to perform the write current optimization procedure, in addition to other drive setup procedures. The write current should be optimized during the production process before users begin to fill the disc surfaces up with valuable data.

Since manufacturing tolerances may be different for each data head in disc drive 10, the write current level is preferably optimized for each data head independently. However, independent optimization is not always required. Data representing the optimized write current levels is then stored in memory 13 so that it can be recalled by drive controller 12 when disc drive 10 is powered up.

Figure 2:
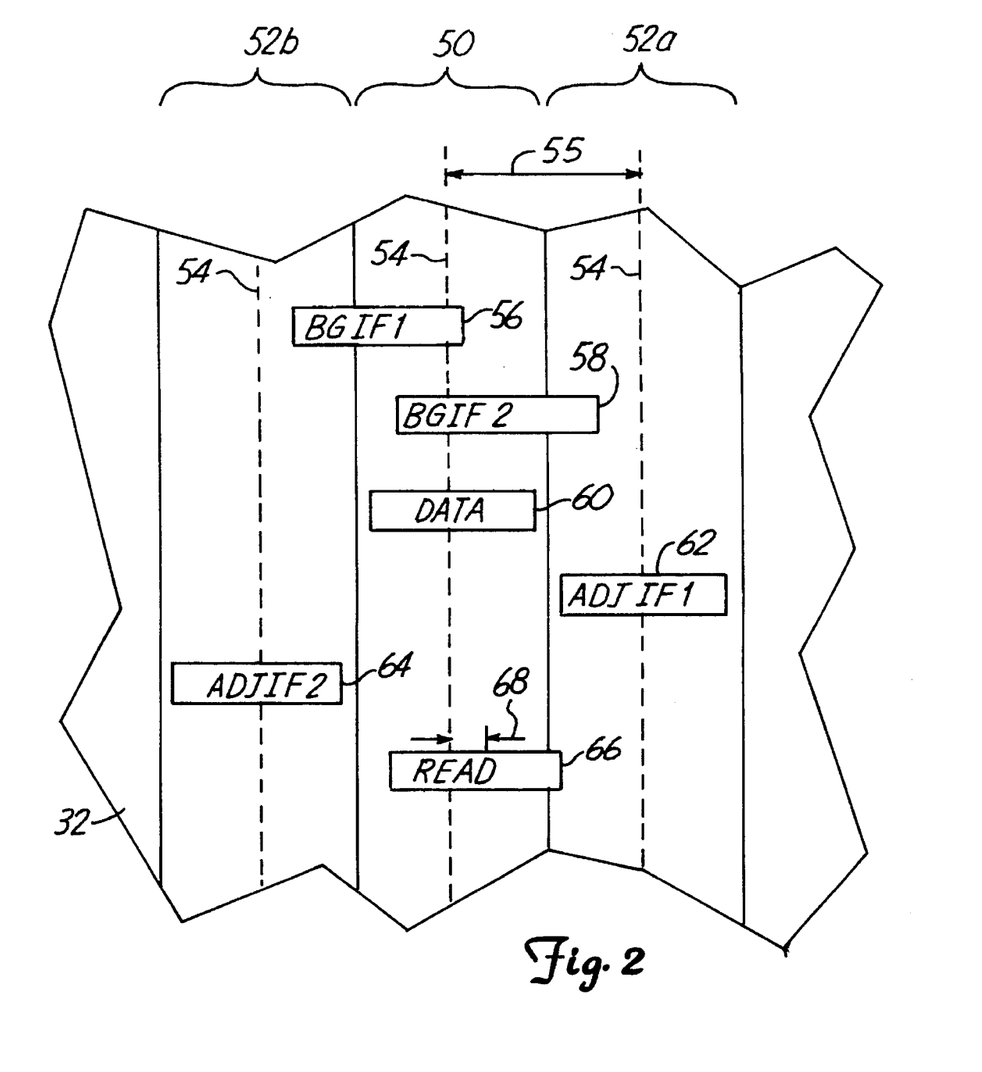
FIG. 2 is a greatly enlarged fragmentary view of a disc surface in the disc drive of FIG. 1.
Figure 3:
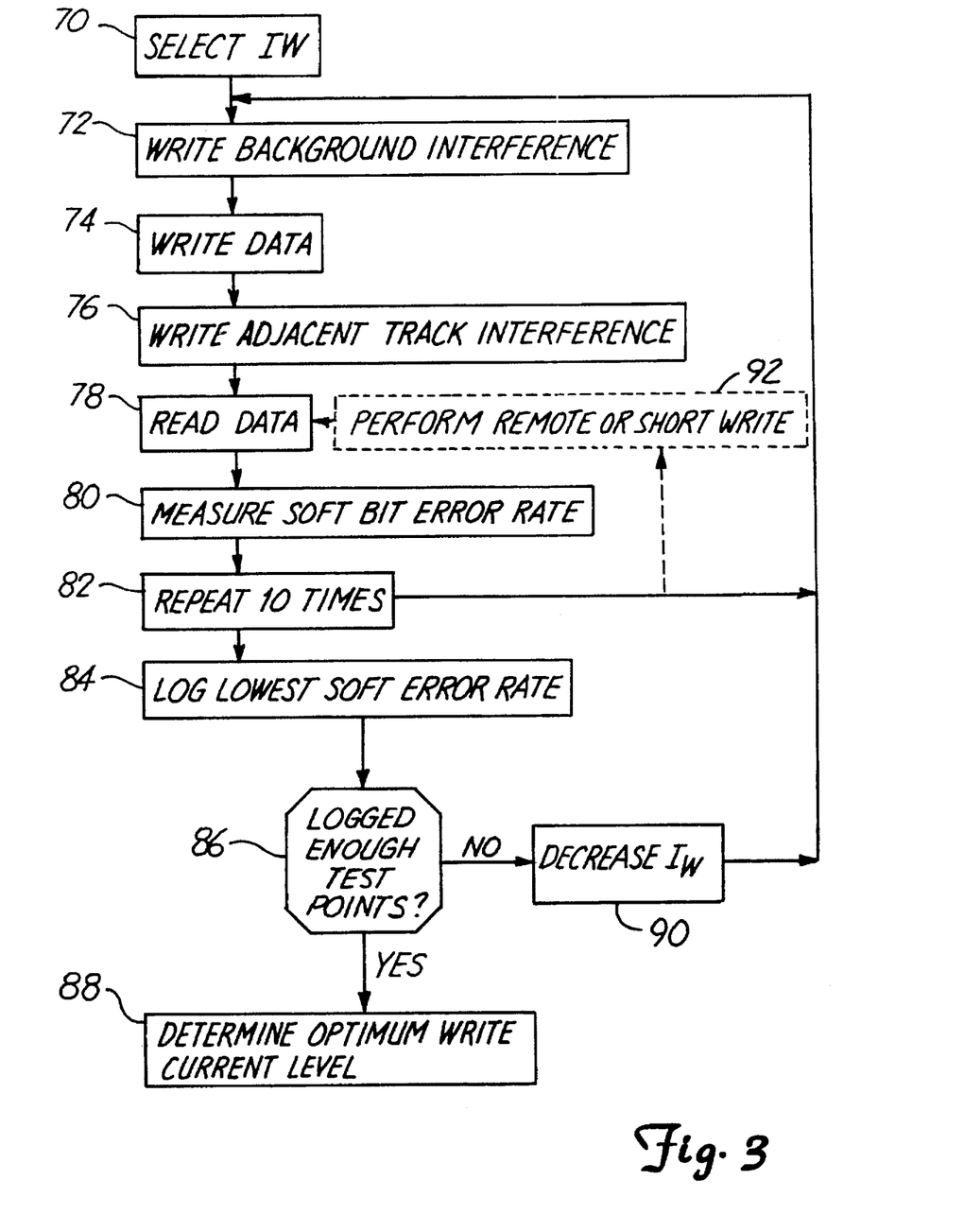
FIG. 3 is a flow chart illustrating one embodiment of the write current optimization procedure of the present invention.

FIGS. 2 and 3 illustrate the write current optimization procedure of the present invention in more detail. FIG. 2 is a greatly enlarged fragmentary view of a disc surface 32 having a plurality of data tracks. FIG. 3 is a flow chart illustrating the steps performed in one embodiment of the write current optimization procedure.

Referring to FIG. 2, disc surface 32 includes a data track 50 disposed between adjacent data tracks 52a and 52b. Data tracks 50, 52a and 52b include ideal track centers 54. Track centers 54 represent the ideal data head position for reading from or writing to the particular data track. The data tracks 50, 52a and 52b are spaced from one another by a distance 55, which is measured between adjacent track centers 54 and is referred to as the track "pitch".

Data head positions 56, 58, 60, 62, 64 and 66 represent sequential writing and reading operations performed on disc surface 32 during the write current optimization procedure of the present invention. The writing and reading operations are described in the flow chart shown in FIG. 3. The write current optimization procedure begins at step 70. At step 70, an initial, nominally high write current $I_w$ is selected that is sufficient for operating long throat heads.

Figure 4:
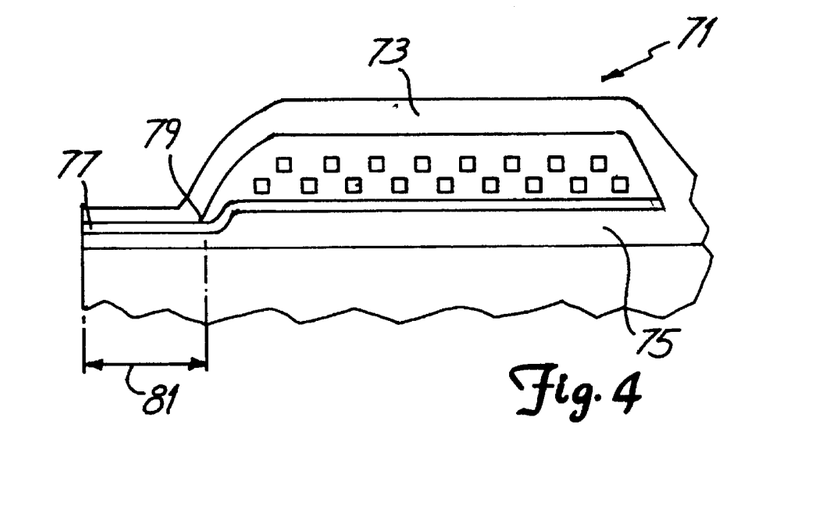
FIG. 4 is sectional view of a thin film data head illustrating a throat length.

The throat length of a thin film data head is shown in FIG. 4. Thin film data head 71 includes a top pole 73, a bottom pole 75 and a throat 77. Throat 77 has a zero throat point 79 and a throat length 81.

Referring back to the flow chart shown in FIG. 3, drive controller 12 writes background interference, at step 72, along data track 50 at data head positions 56 and 58 (FIG. 2). The background interference can be written along the entire data track 50 or within a particular sector of data track 50. The background interference is preferably written significantly off-track during two write operations. For example, during the first write operation, background interference "BG IF 1" is written off-track to the left of ideal track center 54. During the second write operation, background interference "BG IF 2" is written off-track to the right of ideal track center 54. Writing the background interference significantly off-track ensures that the fringes of data track 50 include interference that stresses both data write and read operations. In one alternative embodiment, background interference is written only to one side of the ideal track center 54, such as the right side.

At step 74, drive controller 12 writes data onto data track 50 at data head position 60. The data overwrites a portion of the background interference "BG IF 1" and "BG IF 2." At step 76, drive controller 12 writes adjacent track interference "ADJ IF 1" and "ADJ IF 2" at data head positions 62 and 64 within adjacent data tracks 52a and 52b, respectively. In the preferred embodiment, the interference and the data are pseudorandom patterns generated from different seed words. In another embodiment, the interference and the data are predetermined test patterns. Also in the preferred embodiment, data head positions 62 and 64 are sufficiently off-track from track centers 54 of tracks 52a and 52b such that they are closer to data track 50 than the track pitch 55 of disc 32. This ensures that the off-track error rate is minimized in the presence of adjacent track interference regardless of fluctuations in track pitch and servo writing operations.

At step 78, drive controller 12 reads the data from data track 50 at data head position 66. As shown in FIG. 2, data head position 66 is slightly off-track and has a position error 68, which is measured from the ideal track center 54 of data track 50. In the preferred embodiment, the drive controller 12 adjusts the read position 66 such that the soft bit error rate at the better of the selected initial write current level $I_w$ and half of the selected initial $I_w$ is about $1 \times 10^{-6}$ errors/bit. The adjusted read position 66 is then used for the remainder of the write current optimization procedure.

Since the write current optimization procedure of the present invention is based on a measured off-track soft bit error rate, the procedure operates more quickly if the read position is off-track. An off-track read position stresses the position error margin and therefore results in a higher soft bit error rate than would be experienced at the ideal track center 54. However, the read operation can be performed at the ideal track center 54.

At step 80 the drive controller 12 and supporting circuitry measure the soft bit error rate during a specified time period or within a specified quantity of data. The soft bit error rate can be either a ratio of the number of errors per data bit read from the first data track or simply a count of the number of errors incurred during the read operation. It can also be measured inversely as a number of error-free bits read per error.

For thin film inductive heads, "wiggle" is expected to confound the soft bit error measurement. Thin film inductive heads tend to be magnetically unstable. The instability can corrupt the read signal and cause the measured error rate to vary over time, especially following a write operation. Therefore, in a preferred embodiment of the present invention, steps 72, 74, 76, 78 and 80 are repeated at step 82 several times for thin film inductive heads. Ten iterations has been found to be sufficient to reduce the effect of head wiggle. The lowest (best) soft error rate is logged, or stored, at step 84 for the selected write current level $I_w$. Since the lowest soft bit error rate has been found to be the most repeatable (as opposed to the average) this error rate is used when optimizing the write current level for thin film heads.

In an alternative embodiment, the background interference, the data and the adjacent track interference are written once (as opposed to re-writing the information for each iteration) and the read operation is performed at step 78 until a sufficient number of errors have been accumulated. The logged soft error rate represents an error rate test point for the selected write current level $I_w$. To reduce the effect of head wiggle, it is desirable to change the read state of the head for each error rate measurement. The read state can be changed by performing a short write operation at step 92 (shown in phantom) before each read operation. The short write operation can be performed near an index mark at the current read position or at a remote track. The error rate measurement should not include the data written during the short write operation.

If enough test points have been logged at step 86, the optimization procedure exits the test loop to step 88. If not, steps 72, 74, 76, 78, 80, 82 and 84 are then repeated at a new write current level. The selected write current level $I_w$ is decreased to the new write current level at step 90. In one embodiment, in which the write current level is continuously adjustable, the write current level is decreased by a factor of 0.75 for each iteration. The particular factor selected determines the speed and accuracy of the write current optimization procedure. In another embodiment, in which the write current level is adjustable between only a few selectable magnitudes, the write current level is decreased at step 90 to one of the lower magnitudes.

When enough test points have been collected, the optimization procedure exits the test loop defined by steps 72 to 86. In one embodiment, the optimization procedure exits the test loop when the measured soft error rate degrades to at least 0.8 decades above the minimum soft error rate logged during the test procedure. In an alternative embodiment, the optimization procedure exits the test loop when a selected number of test points have been logged.

At step 88, the optimization procedure determines the optimum write current level as a function of the logged soft error rates. In one embodiment, the optimization procedure determines the optimum write current level as simply the lowest logged soft error rate.

Figure 5:
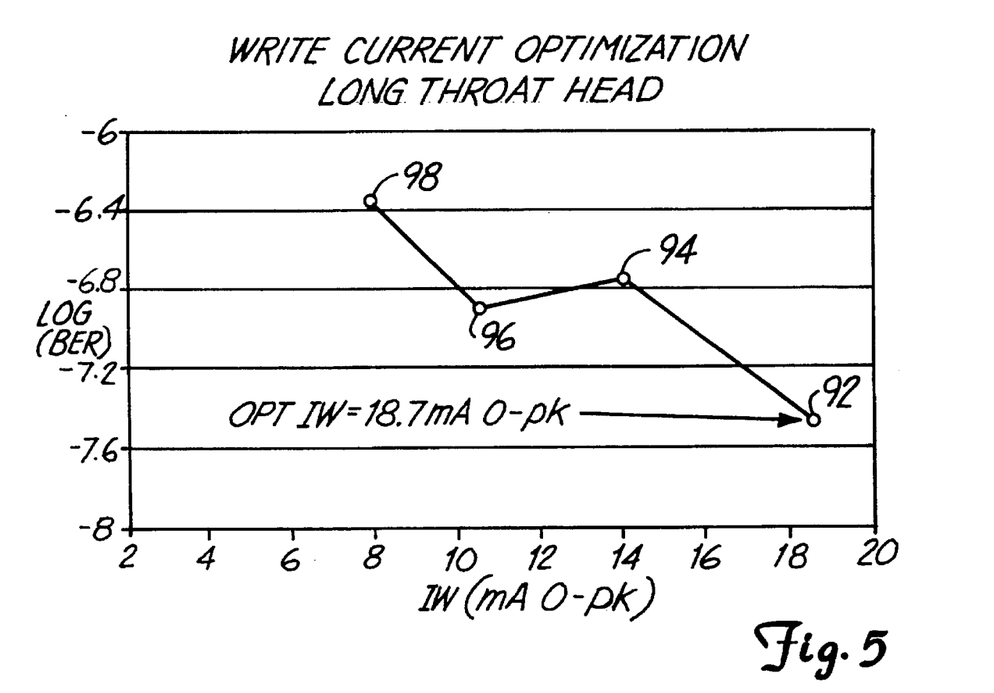
FIG. 5 is a graph illustrating how an optimum write current level is selected for a long throat head according to the present invention.
Figure 6:
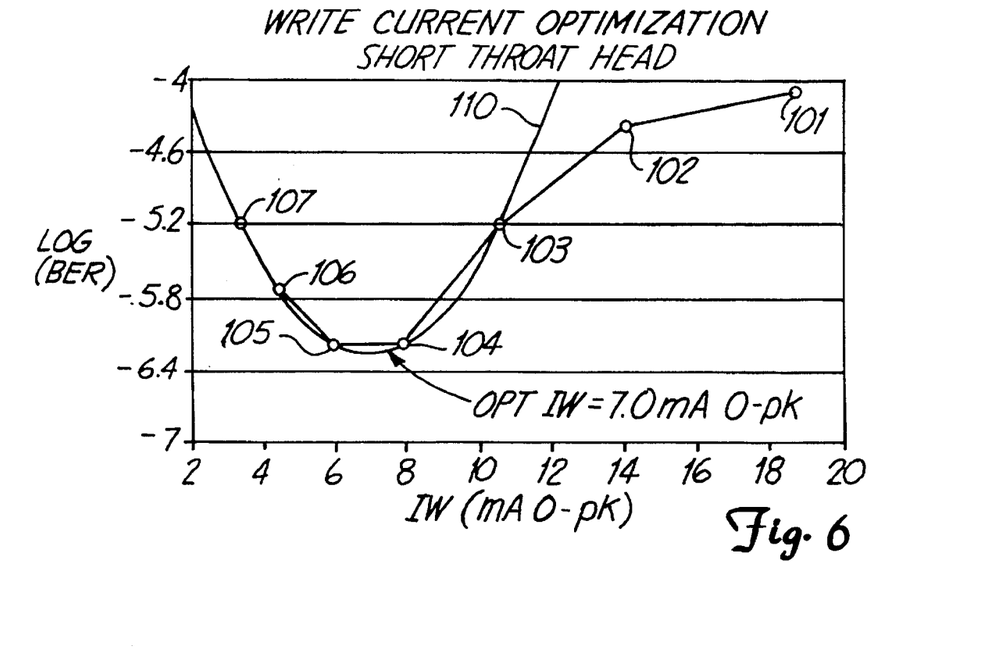
FIG. 6 is a graph illustrating how an optimum write current level is selected for a short throat head according to the present invention.

In another embodiment, the optimization procedure determines whether the lowest logged soft error rate corresponds to the highest write current level. If so, this level is optimum. If not, the optimization procedure fits a second order curve to at least three of the logged soft error rates (preferably all that reinforce a concave up parabola) to approximate a minimum soft error rate. One of these three logged soft error rates includes the minimum logged soft error rate. The optimum write current level corresponds to the lowest point on the curve. FIGS. 5 and 6 illustrate this operation.

FIG. 5 shows the results of the write current optimization procedure of the present invention on a thin film head having a long throat length. FIG. 5 is a graph of the logarithm (base 10) of the bit error rate ("BER") as a function of the write current $I_w$ in milliamps (mA). The graph includes test points 92, 94, 96 and 98. Since a data head having a long throat length does not have pole tip saturation problems, the highest write current level (test point 92) results in the lowest bit error rate. If the highest write current level results in the lowest bit error rate, then this current level is optimum and a curve fit is not necessary. For a data head having the results shown in FIG. 5, the minimum bit error rate occurs at 18.7 mA.

If the highest current level does not result in the lowest bit error rate, then the curve fitting operation can be used to determine the optimum write current level. FIG. 6 illustrates a second order curve fitting operation. FIG. 6 is a graph of the logarithm (base 10) of the measured bit error rate as a function of the selected write current level $I_w$, with the head in a different read state for each measurement.

Each test point 101 through 107 on the graph of FIG. 6 represents the lowest (best) of ten measured soft bit error rates at the selected write current level $I_w$. The test points shown in FIG. 6 represent a thin film head having a short throat length causing pole tip saturation. At high current levels, the bit error rate is relatively large. The bit error rate initially decreases toward a minimum as the write current level decreases and then increases again at low current levels. As discussed above, once the bit error rate degrades 0.8 decades above the minimum logged bit error rate (to a log(BER) of about −5.2 in this case), the optimization procedure has collected enough test points to calculate an optimum write current level.

In the embodiment shown in FIG. 6, a second order curve fit is applied to the logged soft error rates that correspond to write current levels which are less than the write current level at the minimum logged soft error rate (i.e. test points 105, 106 and 107). The second order curve is also fit to the logged soft error rates that correspond to write current levels which are greater than the write current level at the minimum logged error rate and which result in a second derivative of the curve being positive (i.e. test points 103 and 104). The second derivative is positive when the delta between the previous error rate and the present error rate is smaller than the delta between the present error rate and the next error rate. The second order curve fit results in a parabola 110 having a lowest point that represents an optimum write current level $I_w$ of 7.0 mA for the particular data head being tested. This value is stored in memory so that each time disc drive 10 is powered up the write current level for the particular data head is set to 7.0 mA.

Figure 7:
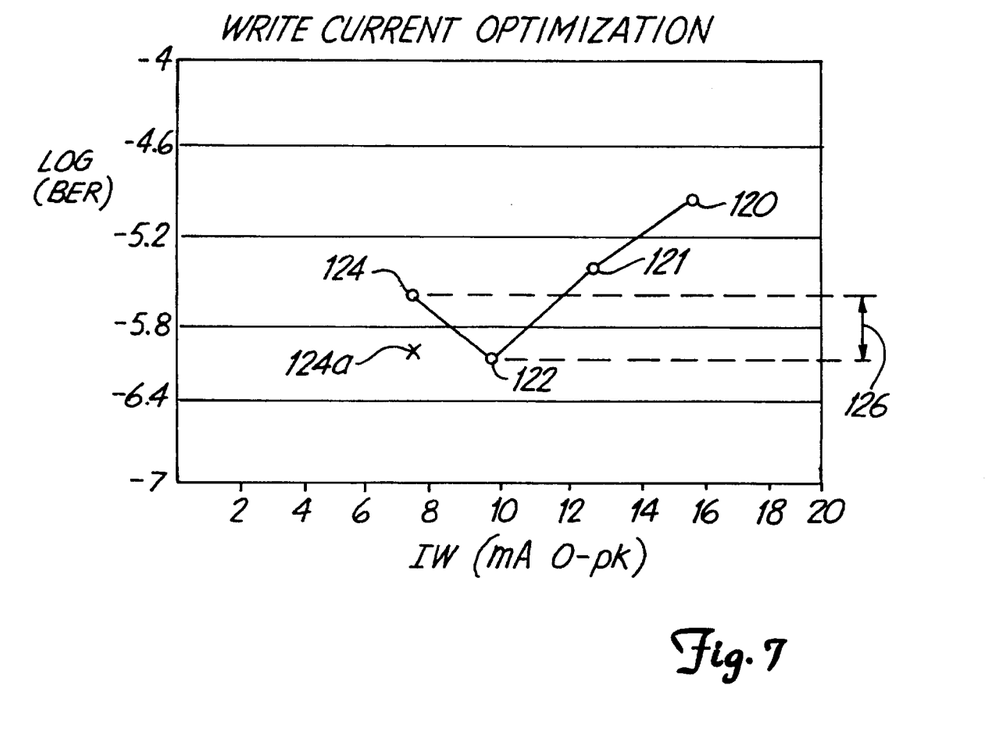
FIG. 7 is a graph illustrating an alternative method of selecting an optimum write current level according to the present invention.

FIG. 7 illustrates an alternative method of determining the optimum write current level as a function of the logged soft error rates obtained through the procedure shown in FIG. 3. Test points 120, 121, 122 and 124 represent the logarithm (base 10) of the measured soft error rates as a function of the write current level $I_w$. Test point 122 represents the lowest logged soft error rate. Test point 124 represents the next lowest logged soft error rate. If the difference between the lowest and next lowest logged soft error rate (arrow 126) is more than a selected factor such as two, then the write current level corresponding to the lowest logged soft error rate (test point 122) is selected as the optimum write current level. Other factors can also be used which would establish a significant difference between error rates, in accordance with the present invention. In this situation, the actual lowest soft error rate should be close to the lowest logged soft error rate.

Test point 124a (shown as an "X") represents a situation in which the difference between lowest logged soft error rate and the next lowest logged soft error rate is less than a factor of two. In this situation, the actual lowest soft error rate is likely to be somewhere between test points 122 and 124a. Therefore, the average (or closest available selection to the average) of the write current levels corresponding to test points 122 and 124a is selected as the optimum write current level.

The write current optimization procedure described with reference to FIG. 7 can be implemented with relatively simple programming techniques and can be completed very rapidly with minimal microprocessor memory resources. However, the procedure is not as accurate as the second order curve fit described with reference to FIG. 6. The second order curve fit is more accurate since it tends to average out the non-repeatability of the test procedure better by making use of a greater number of test points. However, the memory requirements for implementing the second order curve fit are generally too costly to install in mass produced disc drives.

As mentioned above, an approximation method is not required to implement the present invention. On its most basic level, the present invention can be implemented by obtaining two test points and selecting the test point having the lowest soft bit error rate.

EXAMPLE 1

Twenty-two data heads were tested at a drive current of 14 mA 0-pk and at an individually optimized write current, which was found by the write current optimization procedure of the present invention. The data heads were fabricated to have a matrix of throat heights, which were targeted at 30, 40, 50, 60 and 70 microinches. A write current saturation test was done on each data head to determine whether each head had pole tip saturation. The following table highlights the results of the tests:

TABLE 1

|  | Parts with pole tip saturation (N = 6) | | Parts without pole tip saturation (N = 16) | |
| --- | --- | --- | --- | --- |
|  | IW = 14 mA 0-pk | IW = optimized | IW = 14 mA 0-pk | IW = optimized |
| ROTM (%Tw-8) | 16.4 | 24.4 | 18.4 | 18.9 |
| Range | 9.1 | 5.4 | 11.8 | 15.4 |
| ROAPE (μin-8) | 12.9 | 24.6 | 19.8 | 21.1 |
| Range | 17.7 | 5.0 | 15.5 | 11.5 |
| ATS (μin-8) | 231 | 225 | 222 | 221 |
| Range | 26 | 25 | 19 | 16 | where:

N=the number of heads;

IW=selected write current;

ROTM=read only timing margin in percent of the clock period or timing window (Tw) at a $1 \times 10^{-8}$ error rate (a larger timing margin is preferred);

RANGE=a difference between a maximum test value and a minimum test value;

ROAPE=read only position error margin, which refers to the distance in microinches that the data head can be off-track with respect to an ideal position while maintaining a soft error rate of $1 \times 10^{-8}$ errors/bit in the presence of off-track background interference (a larger position error margin is preferred); and ATS=average minimum track spacing, which refers to how close, in microinches, adjacent tracks can be positioned relative to one another while maintaining the ROAPE value measured in the absence of adjacent track interference writes (the minimum track spacing intercept should not exceed the track pitch of the drive).

Several observations can be made from the test results shown in table 1.

The data heads with pole tip saturation performed better at the optimum write current level than did the data heads without pole tip saturation at the fixed write current.

The ROTM and ROAPE are larger (better) for the data heads with pole tip saturation at the optimum write current than for the data heads without pole tip saturation at either the fixed or the optimum write current. This result is because the shorter throat heads are more efficient than the longer throat heads.

Optimizing the write current tightened the statistical distribution of ROAPE for both types of heads. The range between the maximum and minimum test values is smaller at the optimum write current than at the fixed write current.

The ROTM was improved by optimizing write current for both types of heads. The range increased for the data heads without pole tip saturation problems. This is because the write current was optimized using an off-track test, which could possibly increase off-track performance at the expense of on-track performance.

Data heads which would have failed one or more of the performance factors for excess track width were "rescued" by reducing the write current, thereby reducing the effective write width. This benefit is an automatic result of the write current optimization procedure of the present invention.

Optimization of the write current on a perhead basis in the presence of background interference and adjacent track interference therefore allows disc drive failure recovery for two different problems—marginally wide heads and pole tip saturation heads.

If the throat height target is reduced, the data heads on the long throat end of the distribution (which is reduced) will be less likely to fail for overwrite problems. Data heads on the short throat end of the distribution having pole tip saturation problems can be used with better results than nominal throat length heads by optimizing the write current.

A delta high frequency amplitude ("HFA") test may be run as an initial production test on the data heads. The delta HFA test is a test that is run on each data head and can be used as a condition for subsequent tests. HFA is a measure of the high frequency amplitude of the analog signal induced in the data head by closely spaced magnetic flux reversals.

Since the write current has not been optimized for the particular data head at the time the HFA test is run, an appropriate write current must be chosen for use during the HFA and other pre-optimization tests. A typical disc drive will have a nominal write current level which is based on the specifications for the particular drive. The appropriate write current can be selected by a variety of methods. For example, the high frequency amplitude can be measured at the nominal write current and at half of the nominal write current. The write current that results in the largest high frequency amplitude is the appropriate write current at which the tests should be run. For example, if the high frequency amplitude at half the nominal write current is greater than 1.5% larger than the high frequency amplitude at the nominal write current, then the tests should be run on the heads at the half nominal write current. These tests can be subjected to the same pass/fail specifications as the test run at the nominal write current level.

EXAMPLE 2

Figure 8:
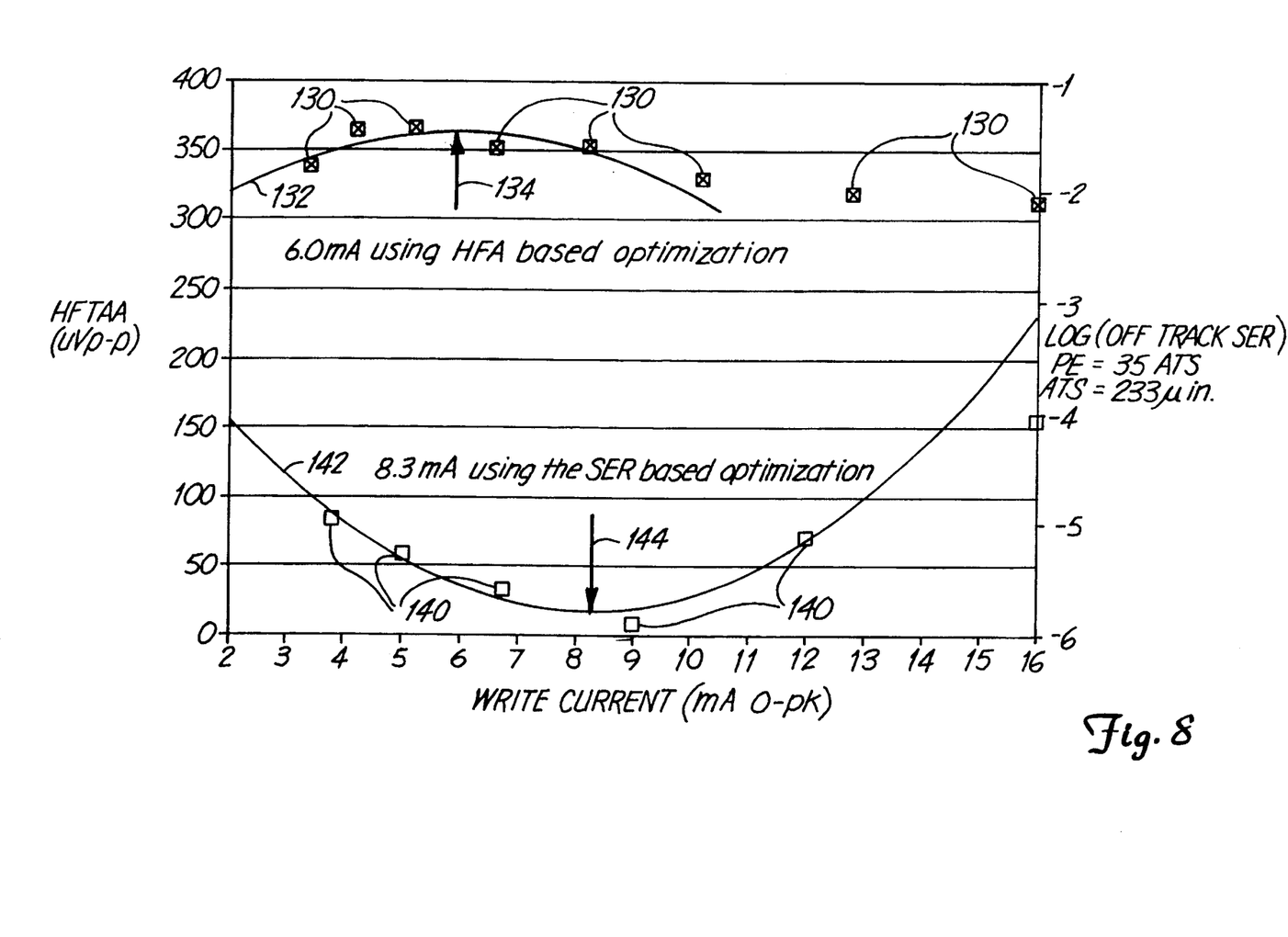
FIG. 8 is a graph illustrating comparative test results of a write current optimization procedure based on a high frequency amplitude and a write current optimization procedure based on off-track error rate.

The optimization procedure of the present invention, which is based on off-track error rate, was compared to an optimization procedure based on high frequency amplitude. FIG. 8 is a graph which illustrates the results of the comparison. The left vertical axis of the graph indicates the high frequency track average amplitude ("HFTAA") in microvolts, peak-to-peak. The right vertical axis indicates the logarithm (base 10) of the off-track soft error rate measured at a position error of 35 microinches from an ideal read position and with an average adjacent track spacing of 233 microinches. The horizontal axis indicates write current in milliamps from zero to peak.

The results of the high frequency amplitude write current optimization procedure are represented by a first set of test points 130, shown as filled-in boxes. The high frequency amplitude does not vary a great deal with changes in write current. Therefore, it becomes more difficult to select an optimum write current level based on the high frequency amplitude. An optimum write current level can be selected as a function of the high frequency amplitude by fitting a curve 132 to the first set of test points 130. As shown in FIG. 8, the optimum write current level for the first set of data points 130 is approximately 6.0 mA, which corresponds to the highest high frequency amplitude (at arrow 134) on curve 132.

The results of the write current optimization procedure based on the soft error rate (SER) of the present invention is represented by a second set of test points 140, which are shown as open boxes. Each test point 140 represents the best soft error rate of 10 write cycles measured in a read-only mode. As shown in FIG. 8, the off-track soft error rate changes in a more pronounced fashion with changes in the write current than in the HFTAA based procedure. Fitting a curve 142 to the second set of test points results in an optimum write current level (the lowest soft bit error rate) of 8.3 mA, as indicated by arrow 144.

EXAMPLE 3

Figure 9:
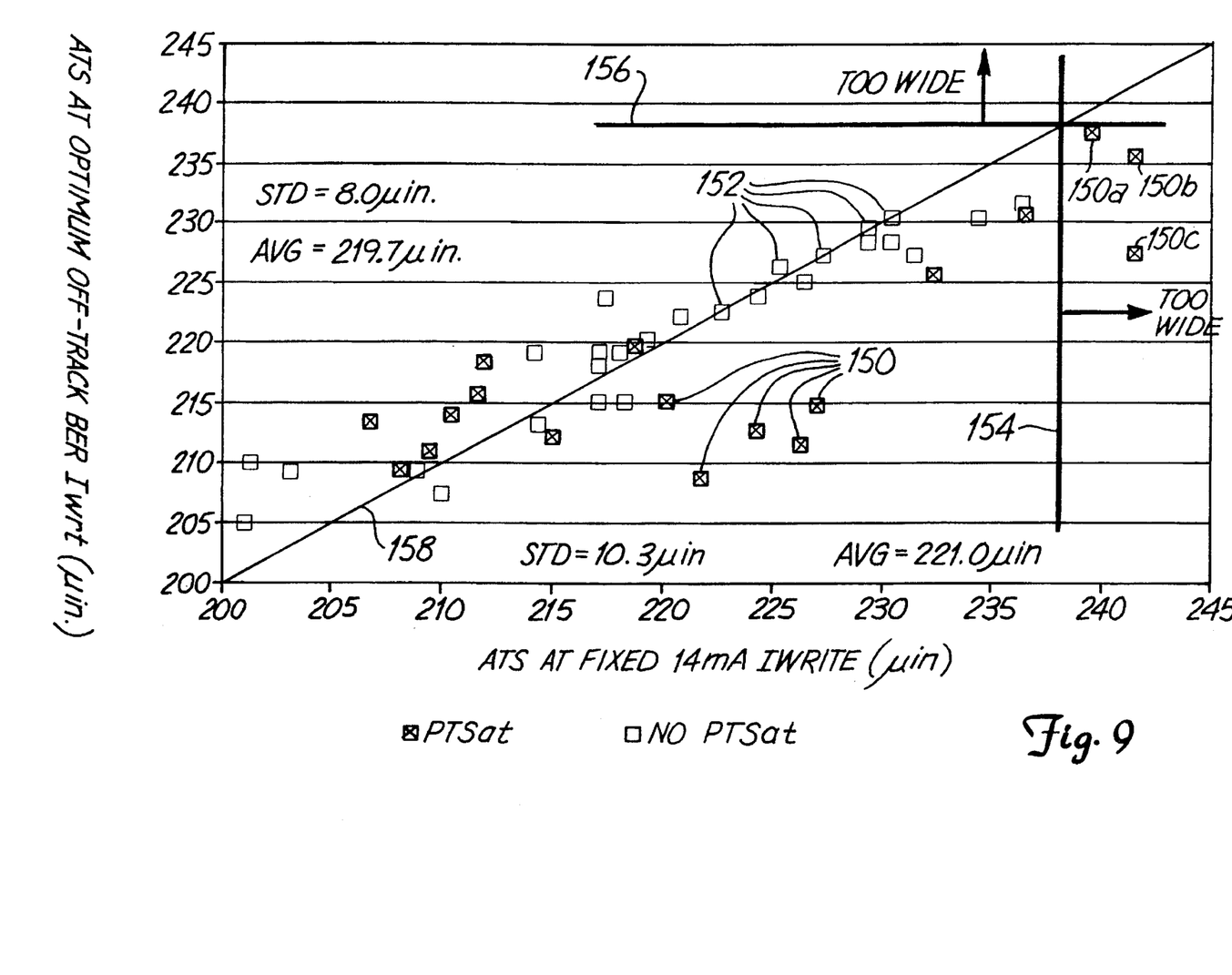
FIG. 9 is a graph comparing average minimum track spacing at a fixed write current level and at an optimum write current level.

FIG. 9 is a graph that illustrates the average minimum track spacing ("ATS") at a fixed write current level and at an optimum write current level. The left vertical axis of the graph indicates the average minimum track spacing in microinches at an optimum write current level based on an off-track bit error rate ("BER"), according to the present invention. The horizontal axis indicates the average minimum track spacing in microinches at a fixed 14 mA write current.

The graph includes a plurality of test points 150 and 152. Each test point represents a particular data head. Test points 150 represent data heads having pole tip saturation and are illustrated by filled-in boxes. Pole tip saturation was identified when the high frequency amplitude changed by greater than or equal to 3% as the write current level changed between 14 mA and 7 mA. Test points 152 represent individual data heads having no pole tip saturation and are illustrated by open boxes.

Referring to the horizontal axis, with the average track spacing measured at a fixed write current level, the standard deviation of the test points 150 and 152 was 10.3 microinches and the average of the test points was 221.0 microinches. Line 154 represents a specification limitation on average track spacing. If a particular data head is too wide, the position error margin will be small in the presence of adjacent track interference. This will generally result in poor drive error rates with use over time, especially when environmental conditions such as temperature are changing. At a fixed write current level of 14 mA, test points 150a, 150b and 150c represent data heads that are too wide and have an average track spacing rating that exceeds the track pitch value and is therefore "out of spec". In other words, if the adjacent data tracks on the disc surface are positioned within 238 microinches of one another (the assumed drive pitch), then the position error margin would be unacceptably low.

Referring to the vertical axis, with the average track spacing measured at the optimum write current level, the standard deviation of the test points 150 and 152 was 8.0 microinches and the average of the test points was 219.7 microinches. The standard deviation at the optimum write current level is therefore smaller (better) than the standard deviation at the fixed write current level. Also, the average track spacing is lower (better) at the optimum write current level than at the fixed write current level.

Line 156 represents the specification limitation on average track spacing, which is the same specification limitation represented by line 154. The data heads represented by test points 150a, 150c and 150b which failed the average track spacing test at the fixed write current level passed the average track spacing test at the optimum write current level. Optimizing the write current level causes the data heads represented by test points 150a, 150b and 150c to have smaller effective widths which allows the heads to pass the average track spacing test. Therefore, the write current optimization procedure of the present invention results in greater yields in data head and disc drive production.

An advantage of the write current optimization procedure of the present invention is that the write current level is optimized to maximize position error margin. If the data head is narrow, maximizing position error margin forces the write current level to increase which results in a larger effective width. If the data head is wide, maximizing position error margin forces the write current level to decrease which results in a smaller effective width. Test points on line 158 have no change in effective width.

Conclusion

Optimizing write current based on position error margin in the presence of background interference stress and adjacent track interference stress results in performance optimization for pole tip saturation situations and for marginally wide head situations with one simple test sequence. The test can be implemented practically in a disc drive. The write current optimization procedure of the present invention can be used to optimize write current for both thin film inductive heads and magnetoresistive heads.

Although the present invention has been described with reference to preferred embodiments, workers skilled in the art will recognize that changes may be made in form and detail without departing from the spirit and scope of the invention. For example, the write current optimization procedure can be performed on a particular data track on the disc surface or on a particular sector of the data track. The procedure can also be performed on different zones of the disc surface to obtain a different optimum current level for each zone. Also, a raw error rate can be used, as opposed to a soft error rate. A raw error rate reflects the occurrence of both soft errors and hard errors (media defects).

The particular test sequence can also be changed without departing from the spirit and scope of the invention. For example, the error rate can be calculated first in the presence of background interference stress and then in the presence of adjacent track interference stress. A simultaneous test, however, is preferred since a simultaneous test runs much quicker and is less complex than a sequential test. In addition, the background interference and adjacent track interference can be written on one side of the ideal track center, as opposed to both sides of the ideal track center.

What is claimed is:

1. A method of optimizing write current in a data storage system, comprising:

selecting a write current level that is greater than an optimum write current level;

writing background interference at the selected write current level on a first data track in the data storage system;

writing data at the selected write current level on the first data track;

writing adjacent track interference at the selected write current level on a data track that is adjacent to the first data track;

reading the data from the first data track at an off-track position;

measuring an error rate in the data read from the first data track;

logging the measured error rate;

decreasing the selected write current level;

repeating the steps of writing background interference, writing data, writing adjacent track interference, reading the data, measuring an error rate and logging the measured error rate; and determining the optimum write current level as a function of the logged error rates.

2. A method of optimizing write current in data storage system, comprising:

selecting a write current level;

writing data on a first data track in the storage system at the write current level;

writing adjacent track interference on a second data track which is adjacent to the first data track;

reading the data from the first data track;

measuring off-track error rate in the data read from the first data track;

repeating the steps of reading and measuring to obtain a plurality of error rates at the selected write current level;

changing the selected write current level;

repeating the steps of writing data, writing adjacent track interference, reading, measuring, and repeating the steps of reading and measuring; and determining an optimum write current level as a function of the measured rates.

3. The method of claim 2 and further comprising:

providing a data head for performing the steps of writing and reading; and wherein repeating the steps of reading and measuring to obtain a plurality of error rates at the selected write current level comprises writing before each reading step to change a read state of the data head.

4. A method of optimizing write current in a data storage system, comprising:

selecting a write current level;

writing background interference on a first data track in the storage system;

writing data on the first data track at the selected write current level;

writing adjacent track interference on a second data track that is adjacent to the first data track;

reading the data from the first data track;

determining an error rate in the data read from the first data track;

repeating the steps of reading and determining an error rate to obtain a plurality of error rates at the selected write current level;

selecting a lowest error rate from the plurality of error rates at the selected write current level;

logging the lowest logged error rate;

changing the selected write current level;

repeating the steps of writing background interference, writing data, writing adjacent track interference, reading, determining an error rate, repeating to obtain a plurality of error rates, selecting and logging; and determining an optimum write current level as a function of the logged error rates.

5. The method of claim 4 wherein writing adjacent track interference comprises:

writing adjacent track interference on a third data track that is adjacent to the first data track and disposed opposite to the first data track from the second data track.

6. The method of claim 4 wherein writing background interference comprises writing background interference at a substantially off-track position from the first data track.

7. The method of claim 4 wherein writing adjacent track interference comprises writing adjacent track interference at a position which is off-track toward the first data track.

8. The method of claim 4 and further comprising:

providing a data head for performing the steps of writing and reading; and wherein repeating the steps of reading and determining an error rate to obtain a plurality of error rates at the selected write current level comprises writing before each reading step to change a read state of the data head.

9. The method of claim 4 wherein:

selecting a write current level comprises selecting an initial a write current level that is greater than the optimum write level; and changing the selected write current level comprises decrementing the selected write current level.

10. The method of claim 4 wherein:

selecting a write current level comprises selecting a write current level that is less than the optimum write current level; and changing the selected write current level comprises incrementing the selected write current level.

11. The method of claim 4 wherein repeating the steps of writing background interference, writing data, writing adjacent track interference, reading, determining an error rate, repeating to obtain a plurality of error rates, selecting and logging comprises:

determining a lowest logged error rate; and repeating the steps of writing background interference, writing data, writing adjacent track interference, reading, determining an error rate, repeating to obtain a plurality of error rates, selecting, logging and changing until the error rate degrades from the lowest logged error rate by a specified factor.

12. The method of claim 4 wherein determining an optimum write current level comprises:

determining a minimum logged error rate; and selecting the optimum write current level as a write current level that corresponds to the minimum logged error rate.

13. The method of claim 4 wherein determining the error rate comprises determining a number of errors per data bit read from the first data track.

14. The method of claim 4 wherein determining the error rate comprises determining a count of errors incurred in the data read from the first data track.

15. The method of claim 4 wherein determining the error rate comprises determining a ratio of a number of error-free bits in the data read from the first data track to a number of bits having errors in the data read from the first data track.

16. A method of optimizing write current in a data storage system, comprising:

selecting a write current level;

writing background interference on a first data track in the storage system;

writing data on the first track at the selected write current level;

writing adjacent track interference on a second data track that is adjacent to the first data track;

reading the data from the first data track;

determining an error rate in the data read from the first data track;

logging the error rate;

changing the selected write current level;

repeating the steps of writing background interference, writing data, writing adjacent track interference, reading, determining an error rate, logging and changing to obtain more than two logged error rates;

determining a minimum logged error rate;

fitting a curve to at least three of the logged error rates, wherein one of the three logged error rates includes the minimum logged error rate; and selecting an optimum write current level as a write current level that corresponds to a lowest point on the curve.

17. The method of claim 16 wherein fitting a curve comprises:

fitting a second order curve to the logged error rates that correspond to write current levels which are less than a write current level corresponding to the minimum logged error rate; and fitting the second order curve to the logged error rates that correspond to write current levels which are greater than the write current level corresponding to the minimum logged error rate and which result in a second derivative of the curve being positive.

18. A method of optimizing write current in a data storage system, comprising:

selecting a write current level;

writing background interference on a first data track in the storage system;

writing data on the first data track at the selected write current level;

writing adjacent track interference on a second data track that is adjacent to the first data track;

reading the data from the first data track;

determining an error rate in the data read from the first data track;

logging the error rate;

changing the selected write current level;

repeating the steps of writing background interference, writing data, writing adjacent track interference, reading, determining an error rate, logging and changing;

determining a lowest logged error rate, the lowest logged error rate having a corresponding write current level;

determining a next lowest logged error rate, the next lowest logged error rate having a corresponding write current level;

selecting an optimum write current level as the write current level corresponding to the lowest logged error rate if a difference between the lowest and next lowest logged error rates is greater than a selected factor; and selecting the optimum write current level as a level between the write current levels corresponding to the lowest and next lowest logged error rates if the difference is less than the selected factor.

* * * * *

UNITED STATES PATENT AND TRADEMARK OFFICE
CERTIFICATE OF CORRECTION

PATENT NO. : 5,600,500
DATED : February 4, 1997
INVENTOR(S) : Madsen et al.

It is certified that error appears in the above-indentified patent and that said Letters Patent is hereby corrected as shown below: On the title page:

Item: [56] References Cited:

Please delete "5,206,053" and insert --5,206,853--.

Col. 16, line 56, please insert --data-- before "track".

Signed and Sealed this

Twenty-fourth Day of March, 1998

Attest:

BRUCE LEHMAN

*Attesting Officer*    *Commissioner of Patents and Trademarks*